United States Patent
Horn et al.

(10) Patent No.: US 10,434,992 B2
(45) Date of Patent: Oct. 8, 2019

(54) SYSTEMS AND METHODS FOR THE REMOVAL OF FERROUS DEBRIS FROM DEGREASER BATHS

(71) Applicant: Toyota Motor Engineering & Manufacturing North America, Inc., Erlanger, KY (US)

(72) Inventors: Michael W. Horn, Kitchener (CA); Jeffrey Alan Booth, Cambridge (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 118 days.

(21) Appl. No.: 15/790,624

(22) Filed: Oct. 23, 2017

(65) Prior Publication Data
US 2019/0118781 A1    Apr. 25, 2019

(51) Int. Cl.
*B60S 3/00* (2006.01)
*B60S 3/04* (2006.01)
*C23G 5/02* (2006.01)

(52) U.S. Cl.
CPC . *B60S 3/04* (2013.01); *C23G 5/02* (2013.01)

(58) Field of Classification Search
None
See application file for complete search history.

(56) References Cited

U.S. PATENT DOCUMENTS

| | | |
|---|---|---|
| 3,143,496 A | 8/1964 | Maretzo |
| 3,539,509 A | 11/1970 | Heitmann et al. |
| 5,273,193 A | 12/1993 | Murakami et al. |
| 8,216,454 B2 | 7/2012 | Araseki |
| 9,328,428 B2 | 5/2016 | Takahashi et al. |
| 2003/0066791 A1 | 4/2003 | Yaegashi et al. |
| 2004/0007249 A1 | 1/2004 | Kishi et al. |
| 2014/0231358 A1 | 8/2014 | Gokpekin et al. |
| 2015/0328644 A1 | 11/2015 | Newman |
| 2016/0008821 A1 | 1/2016 | Yount et al. |
| 2016/0184833 A1 | 6/2016 | Yen et al. |
| 2016/0362952 A1 | 12/2016 | Williamson et al. |

*Primary Examiner* — Eric W Golightly
(74) *Attorney, Agent, or Firm* — Christopher G. Darrow; Darrow Mustafa PC

(57) ABSTRACT

Systems and methods are provided for removing ferrous debris from a vehicle assembly in an alkaline degreaser bath. A degreaser tank is configured in shape and size to accommodate a degreasing cleaning of vehicle assemblies. A conveyor system may selectively transfer vehicle assemblies into and out of the degreaser tank. A flushing system includes a plurality of debris removal flushing stations strategically located at side walls of the degreaser tank. Each station includes a set of electromagnets adjacent to an exterior of the degreaser tank to attract metal debris to a collection area at an interior wall, opposite the set of electromagnets. A drain port is located at the side wall, below the electromagnets. A supply line is provided above the electromagnets to selectively provide degreaser toward and direct debris to the drain port. A controller engages each debris removal flushing station based on a predetermined cycle.

16 Claims, 5 Drawing Sheets

SYSTEMS AND METHODS FOR THE REMOVAL OF FERROUS DEBRIS FROM DEGREASER BATHS

TECHNICAL FIELD

The present disclosure generally relates to degreaser baths and, more particularly, to the removal of ferrous debris from alkaline degreaser baths using electromagnets and flushing stations.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Prior to entering a paint booth area, vehicle assemblies may be covered in metal dust, filings, stamping oils, and other debris from various welding processes. In certain instances a vehicle assembly, sometimes referred to as a body-in-white, includes various sheet metal components of the vehicle that have been welded together. The body-in-white can be subjected to various operations and processes associated with the ultimate vehicle assembly, and various types of foreign material, such as ferrous debris, also known as weldballs, can adhere to the body-in-white as a result of these operations prior to the surface treatment or coating applications. Surface cleaning and preparation processes are important considerations of a vehicular assembly processes. In order to attain an effective and aesthetically pleasing finished vehicle surface that also protects against rust and corrosion, an underlying substrate should be effectively free of foreign material including, but not limited to, foreign dust particles, dirt particles, weldballs, lint, oils and the like during various phases of surface treatment and coating processes. To achieve a suitable, durable substrate surface to which various paints and finishes can adhere, great care is taken such that paint booths and spray-coating booths are clean and dust free. However, if the substrate entering the paint booth is not clean or dust free, there remains a high risk of contamination during the surface treatment or coating process.

Various degreaser cleaning processes have been proposed and attempted. However, certain attempts have been met with varying degrees of limited success, either in the effectiveness in the removal of foreign material and/or in the risk of recontamination of the body-in-white or substrate during degreasing and cleaning operations. Accordingly, there remains a need for an improved way of preventing ferrous debris that may have accumulated in a degreaser bath from reattaching to a body-in-white and becoming a defect in the coating finish.

SUMMARY

This section provides a general summary of the disclosure, and is not a comprehensive disclosure of its full scope or all of its features.

In various aspects, the present teachings provide a degreaser tank for removing debris from vehicle assemblies. The degreaser tank may include a perimeter having at least one side wall and a bottom surface cooperating to define a holding tank with an exterior and an interior. The interior is configured to store an alkaline degreaser to remove debris from at least one vehicle assembly. At least one debris removal flushing station may be provided, located along the at least one side wall. The debris removal flushing station may include a set of one or more electromagnets adjacent to an exterior of the holding tank and configured to attract metal debris to the side wall. A drain port may be provided, located at the side wall, a distance below the set of electromagnets. A supply line may be provided located a distance above the set of electromagnets and configured to selectively provide a stream of alkaline degreaser toward the debris, directing debris to the drain port.

In other aspects, the present teachings provide a system for removing ferrous debris from a vehicle assembly in an alkaline degreaser bath. The system may include a degreaser tank configured in shape and size to accommodate a degreasing cleaning of vehicle assemblies. A conveyor system may be provided, configured to selectively transfer the vehicle assemblies into and out of the degreaser tank. A flushing system may be provided, including a plurality of debris removal flushing stations strategically located at side walls of the degreaser tank. Each debris removal station can include a set of electromagnets located adjacent to an exterior of the degreaser tank and configured to attract metal debris to a collection area at an interior wall, opposite the set of electromagnets. A drain port may be provided at the side wall, a distance below the set of electromagnets. A supply line located a distance above the electromagnets may be configured to selectively generate a stream of alkaline degreaser and direct debris to the drain port. A controller may be provided, configured to engage each debris removal flushing station based on a predetermined cycle.

In still other aspects, the present teachings provide a method for removing ferrous debris from a vehicle assembly in an alkaline degreaser bath. The method may include transferring at least one vehicle assembly through a degreaser tank with an alkaline degreaser to remove metal debris from the vehicle assembly. A set of electromagnets may be engaged at a debris removal flushing station. The set of electromagnets may be coupled to an exterior of the degreaser tank, attracting the metal debris to a collection area on an interior wall of the degreaser tank, opposite the set of electromagnets. The method may include selectively disengaging the set of electromagnets at a first predetermined time and generating a stream of alkaline degreaser from a supply line located a distance above the electromagnets, directing the metal debris from the collection area to a drain port. The method includes filtering the metal debris from the degreaser through a pump and filter, and recirculating a filtered degreaser to the degreaser tank. The set of electromagnets may then be engaged at a second predetermined time, and the method repeats.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

Figure 1:
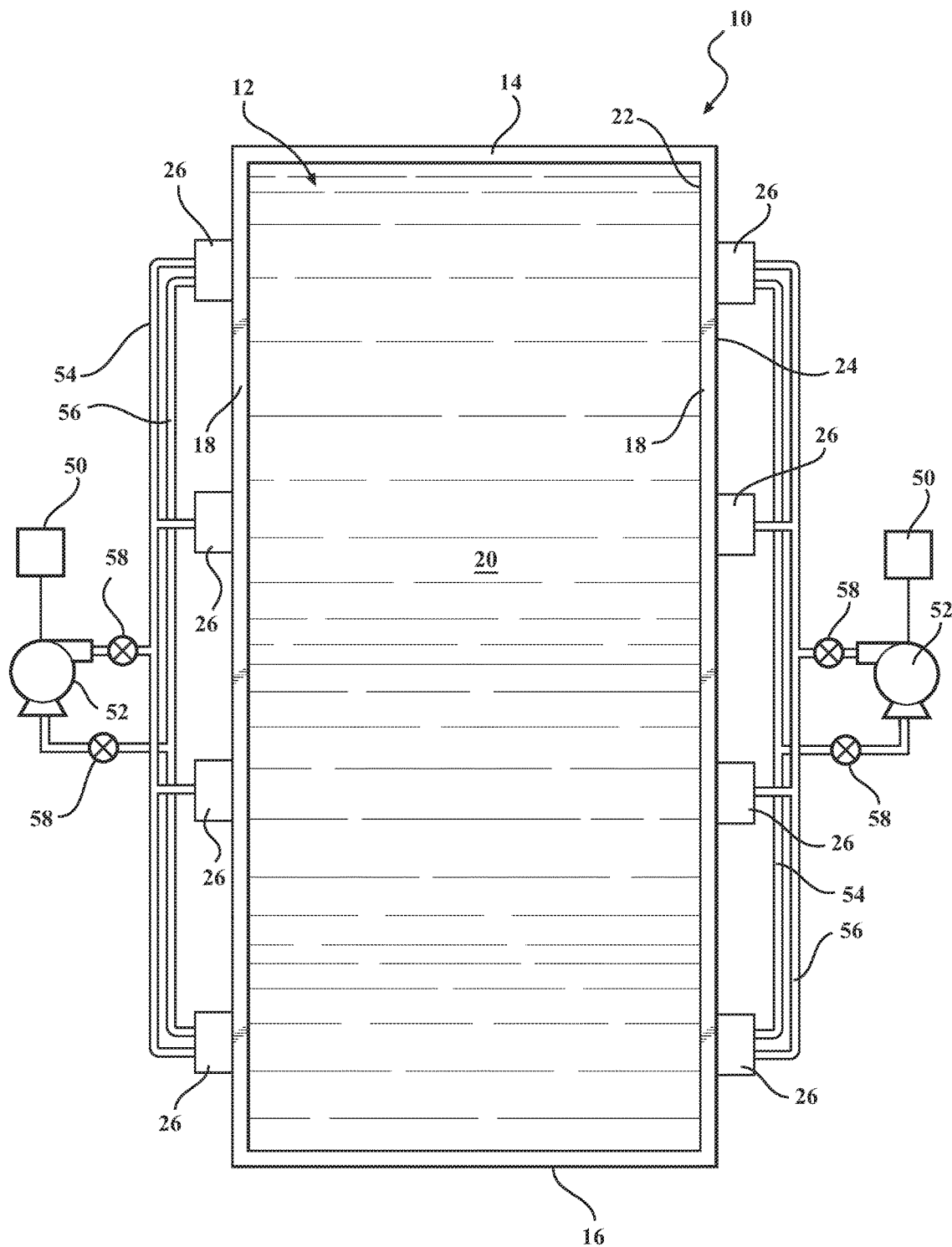
FIG. 1 is a schematic top plan view of an exemplary degreaser tank assembly according to various aspects of the present technology.

It should be noted that the figures set forth herein are intended to exemplify the general characteristics of the methods and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present technology generally related to improved degreaser baths, and more particularly, to systems and methods that provide for an increased removal of ferrous debris from vehicle assemblies using alkaline degreaser baths provided with electromagnets and flushing systems. In particular, the present technology provides a degreaser tank assembly with one or more debris removal flushing stations that attract ferrous debris removed from the vehicle assembly by the alkaline degreaser so that it does not accumulate in the degreaser bath and subsequently re-deposit on the vehicle assembly that may be travelling down an assembly line through the degreaser bath. As will be discussed in more detail below, a flushing operation occurs based on a predetermined cycle to direct collected and accumulated debris through a centrifugal pump and one or more bag filters having a small nominal diameter (e.g., less than 1 micron), and filtered degreaser is then recirculated back to the degreaser tank.

Various known degreaser bath configurations may circulate a cleaning fluid, such as a degreaser, through filters to remove debris from the bulk cleaning liquid. For example, various degrease baths may be provided with a residence time of about 20 minutes. Because many of the filters are located on basic circulation lines, the liquid only has brief contact with the filters before being returned to the bath, where it is likely to pick up metal debris that can redeposit on the vehicle assembly being cleaned. In addition, any areas of low flow inside the tank may accumulate unwanted metal debris because they turn over less frequently than high flow areas. There are two common types of filters in degrease stages, namely bag filters and flushing magnetic filters. Generally, bag filters operate by passing the liquid through a permeable cloth-like material to filter our particulate that is larger than a nominal diameter opening, such as 10 to 50 microns. Flushing magnetic filters generally operate by pumping liquid through an electromagnet located in a tube or housing. After a certain time period, the filter diverts the liquid to a waste stream, to rid the filter of debris, along with a certain amount of degreaser liquid being filtered.

The present technology provides a degreaser tank system with a flushing system that may include a plurality of debris removal flushing stations that are configured to act on the bulk degreaser liquid in the degreaser tank instead of filtering debris through a circulation line. In various aspects, the debris of interest for removing is a ferrous metal debris and can be attracted by magnetic fields. Thus, the system is able to attract and remove metal debris, such as weldballs and metal mud, directly from the vehicle assemblies, preventing the weldballs from accumulating back in the bulk fluid, with the potential of redepositing on the vehicle assemblies.

With reference to the various figures, FIG. 1 is a schematic top plan view of an exemplary degreaser tank assembly 10 according to various aspects of the present technology for removing debris from vehicle assemblies. The degreaser tank 12 may include a plurality of side walls defining a perimeter. It should be understood that the shape and size of the degreaser tank may vary widely. The degreaser tank 12 may incorporate various materials, and many components may be made of steel or equivalent. Although generally rectangular or square shaped, the degreaser tank 12 may alternatively be circular or oval, or not necessarily have distinct or separate side wall portions. In those instances, references to specific side walls should be considered to be references to specific side areas of the tank that define the perimeter and serve the same purpose as defined herein. As shown, the degreaser tank 12 may include a front side wall 14, a rear side wall 16, and two additional opposing side walls 18, with a bottom surface 20 cooperating to define a holding tank with an exterior 22 and an interior 24. The interior 22 is configured to store an alkaline degreaser to remove debris from at least one vehicle assembly. The various side walls 14, 16, 18 may be perpendicular or angled with respect to the bottom surface 20; in certain embodiments they may be shaped or curved. Similarly, the bottom surface 20 may be generally planar or otherwise curved or shaped. At least one debris removal flushing station 26 may be provided, located along one of the plurality of walls 14, 16, 18. As shown in FIG. 1, a plurality of debris removal flushing stations 26 are provided as part of the degreaser tank assembly 10. In particular, each side wall 18 of the degreaser tank 12 is provided with a plurality of spaced-apart debris removal flushing stations 26. Although the flushing stations 26 are illustrated as being substantially equally spaced apart, the specific locations can be determined based on the tank size and particular characteristics of the specific tank geometry. For example, the debris removal flushing stations 26 can be strategically located at various positions in the tank that can best serve to remove debris from the vehicle assemblies 30, as well as to prevent or minimize what may be referred to as dead spots, or areas within the tank that may not have as much circulation.

Figure 2:
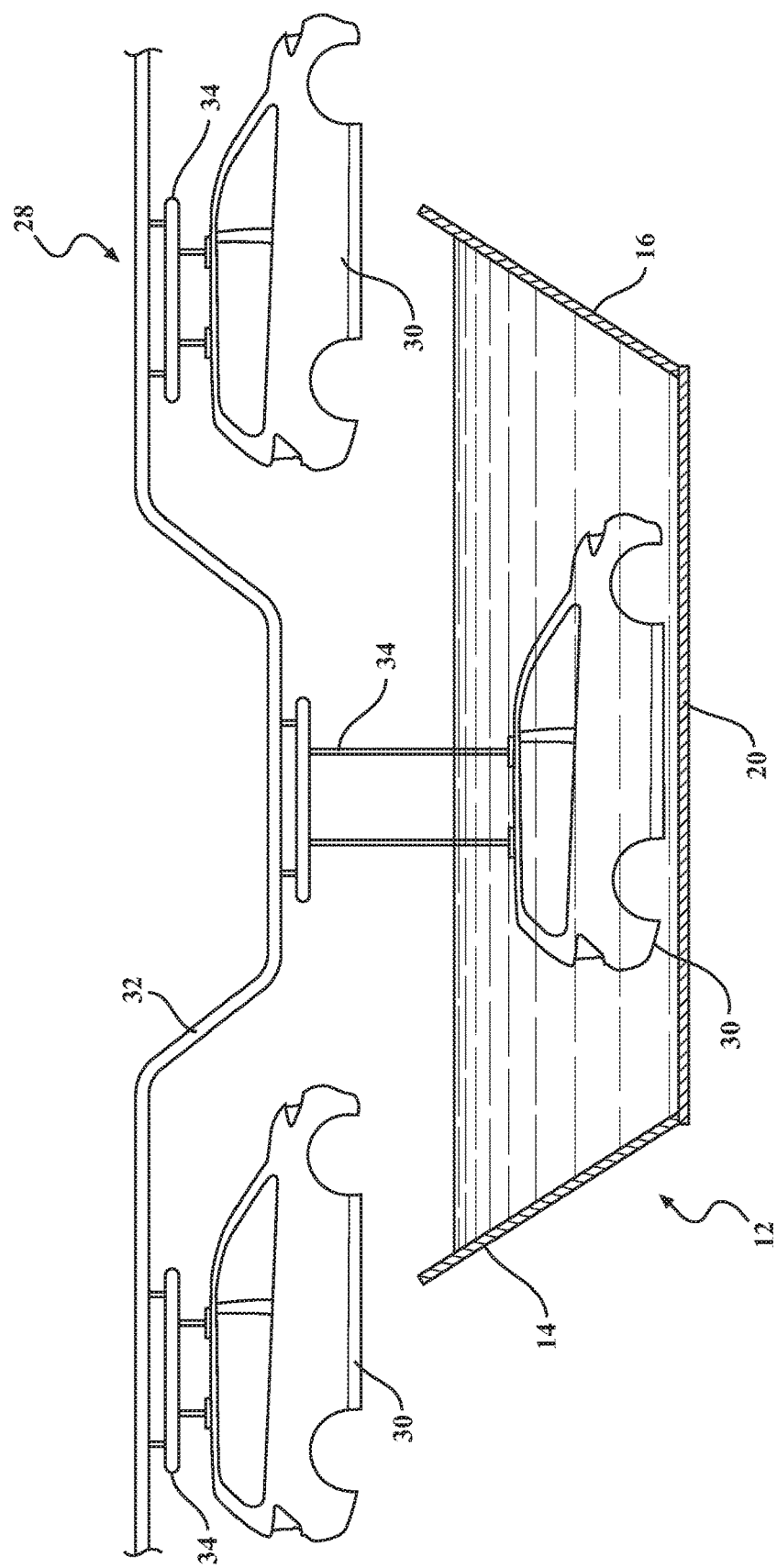
FIG. 2 is a schematic side plan view of the assembly of FIG. 1 with a conveyor transferring a vehicle assembly through the degreaser tank.

FIG. 2 is a schematic side plan view of an exemplary degreaser tank assembly 10, similar to that shown in FIG. 1, with a conveyor system 28 configured to transfer one or more vehicle assemblies through the degreaser tank 12 for cleaning. The various debris removal flushing stations 26 are not shown in FIG. 2 for clarity purposes. The conveyor system 28 may be configured in a variety of different manners and may transfer one or more vehicle assemblies 30 through the degreaser tank 12 at one time. The conveyor system 28 can include various rails 32 and coupling mechanisms 34 that cooperate to raise and lower the vehicle assemblies 30 into and out of the degreaser tank 12. In certain aspects, one or more vehicle assembly 30 may be dipped (raised and lowered) into the degreaser tank 12, while in other aspects the vehicle assembly 30 may be lowered into the degreaser tank 12 and travel in a substantially linear dimension from the front side wall 14 toward the rear side wall 16. In various aspects, multiple vehicle assemblies 30 may be present in the degreaser bath 12 at the same time and in various stages of the process.

Figure 3:
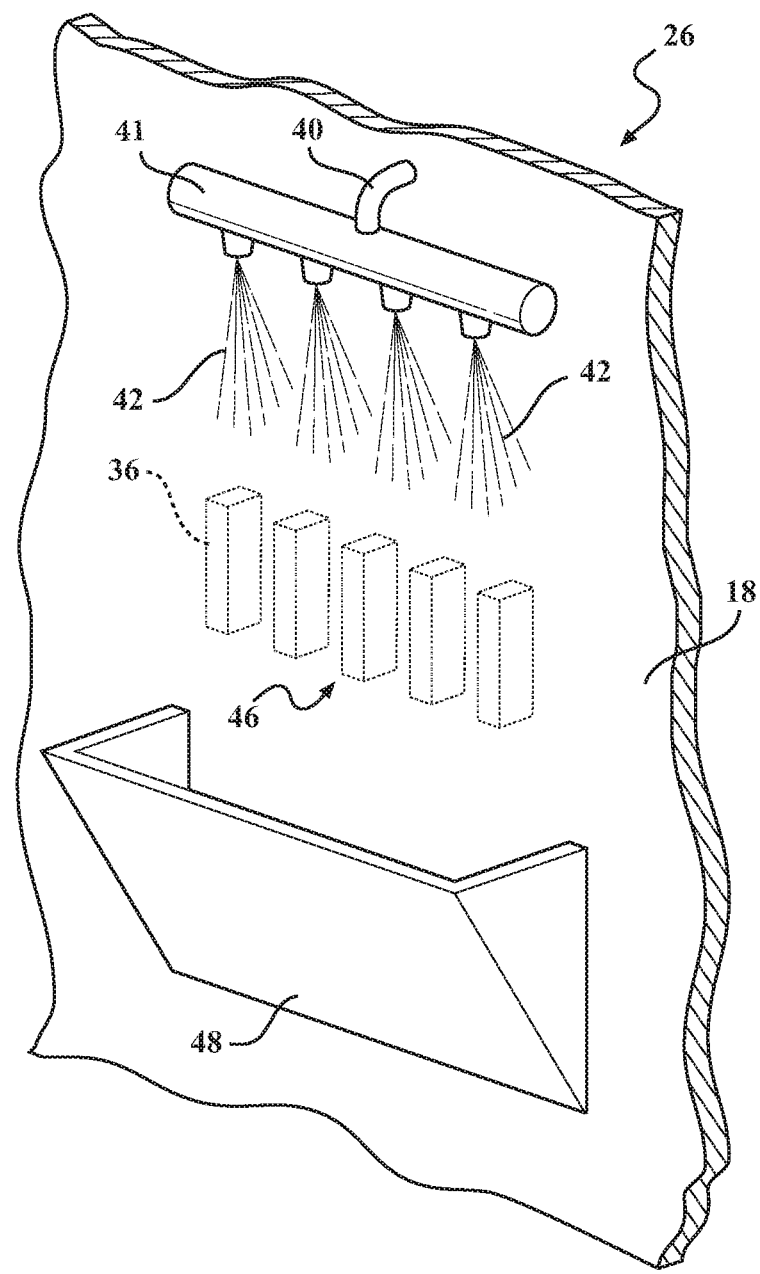
FIG. 3 is a side perspective view of an exemplary debris removal flushing station located in an interior of the degreaser bath.

FIG. 3 is a side perspective view of an exemplary debris removal flushing station 26 configured to be located in an interior 22 of the degreaser bath 12, for example, at a side wall 18, or at an interior of a side perimeter of the degreaser bath 12 for those baths having a shape that does not necessarily define a separate side wall portion. Generally, each of the debris removal flushing stations 26 may include a set of electromagnets 36 adjacent to an exterior 24 of the holding tank and configured to attract metal debris 44 (see, FIGS. 4A-4B) to the side wall 18. The set of electromagnets 36 may be secured, mounted, or otherwise coupled to an exterior 24 surface, or they may be housed or located within another container or housing that is placed adjacent the exterior surface 26. In various aspects when the set of electromagnets 36 is engaged or in an operating mode, the debris 44 may be attracted to a specific collection area 46 on an interior wall of the holding tank 12, generally opposite the set of electromagnets 36. It is contemplated that in certain optional aspects, a release lining may be provided at the collection area 46 to ease in the removal of debris. It should be understood that any such lining, if provided, would need to be compatible with a continuous immersion in the degreaser. A drain port 38 may be provided, located at one of the side walls 18, which may be a distance below the set of electromagnets 36 for collecting and filtering the debris as discussed below. A supply line 40 may be provided located a distance above the set of electromagnets 36. The supply line 40 may be configured to selectively provide a stream 42 of alkaline degreaser through a manifold 41 that may be provided with a plurality of spray nozzles configured to direct the degreaser toward the debris, directing debris to the drain port 38 that ultimately leads to a pump and filter. In various aspects, the manifold 41 and spray nozzles may be stationary, in other aspects, the manifold may be movable, either manually or using a controller.

In various aspects, a collection chute 48 may be provided and generally located near and below the collection area 46. As shown, the collection chute 48 may be coupled to or extend from an interior 22 of the degreaser tank 12 and is appropriately sized and shaped to capture or funnel falling debris 44 and/or to ultimately direct the debris 44 in a direction toward the drain port 28.

The electromagnets 36, shown in phantom because they are adjacent the exterior 24, can be shaped and sized to match various shapes and configurations of the degreaser tank. In various aspects, they magnets may be provided aligned in one or more rows, as shown in FIG. 3. By being located adjacent an exterior 24 of the degreaser tank 12, there are no material compatibility issues or concerns because the electromagnets 36 do not come into contract with the either the debris or the bulk degreaser fluid.

With renewed reference to FIG. 1, the degreaser tank assembly 10 may include one or more controllers 50 configured to manage and control various operations related to the flushing operations of the debris removal flushing stations. As described above, the vehicle assemblies 30 (see, FIG. 2) may be portions of a vehicle, various vehicle subassemblies or bodies-in-white, and their size and shape may differ in many regards. Certain assemblies 30 may have had more welding operations performed thereon than others, and certain assemblies 30 may have more stamping oil or different types of debris than others, which may impact the residence time of the assembly 30 being in the degreaser tank 12, the speed at which the assembly 30 travels, as well as the cycle times for actuating the flushing stations 26. In various aspects, the controller 50 may be configured to selectively engage the flushing operation of each debris removal flushing station 26 using a predetermined cycle. As non-limiting examples, the predetermined cycle may be based on the specific volume of vehicle assemblies being cleaned (number per time period), a type or size of vehicle assembly being cleaned, a type of debris that may present on the vehicle assembly, and type of degreaser (alkaline or otherwise).

In various aspects, the sets of electromagnets 36 may be engaged in an operating capacity almost on a continuous basis until the flushing operation takes place. In some examples, the flushing operation may be engaged about one every three hours, once every two hours, once every hour, or multiple times every hour, depending on the debris build-up. In one particular example, the flushing operation may be engaged between about 2 and 6 times per hour, or about four times per hour. In certain aspects there may be optional cameras or sensors present to detect a level of accumulation of debris. The controller 50 can be configured to engage each of the flushing stations at the same time, or stagger the actuation in a series or predetermined pattern. In various aspects, the flushing operation only requires a time period of from about 10 seconds, about 20 seconds, about 30 seconds, or up to about one minute or longer depending on the circumstances. In addition to engaging and disengaging the set of electromagnets 36, the controller 50 may also be configured to operate one or more aspects of the conveyor system 28, operate the pumps 52 and any filtering devices, as well as open and close any automated valves 58 that may be present throughout the system.

Figure 4A:
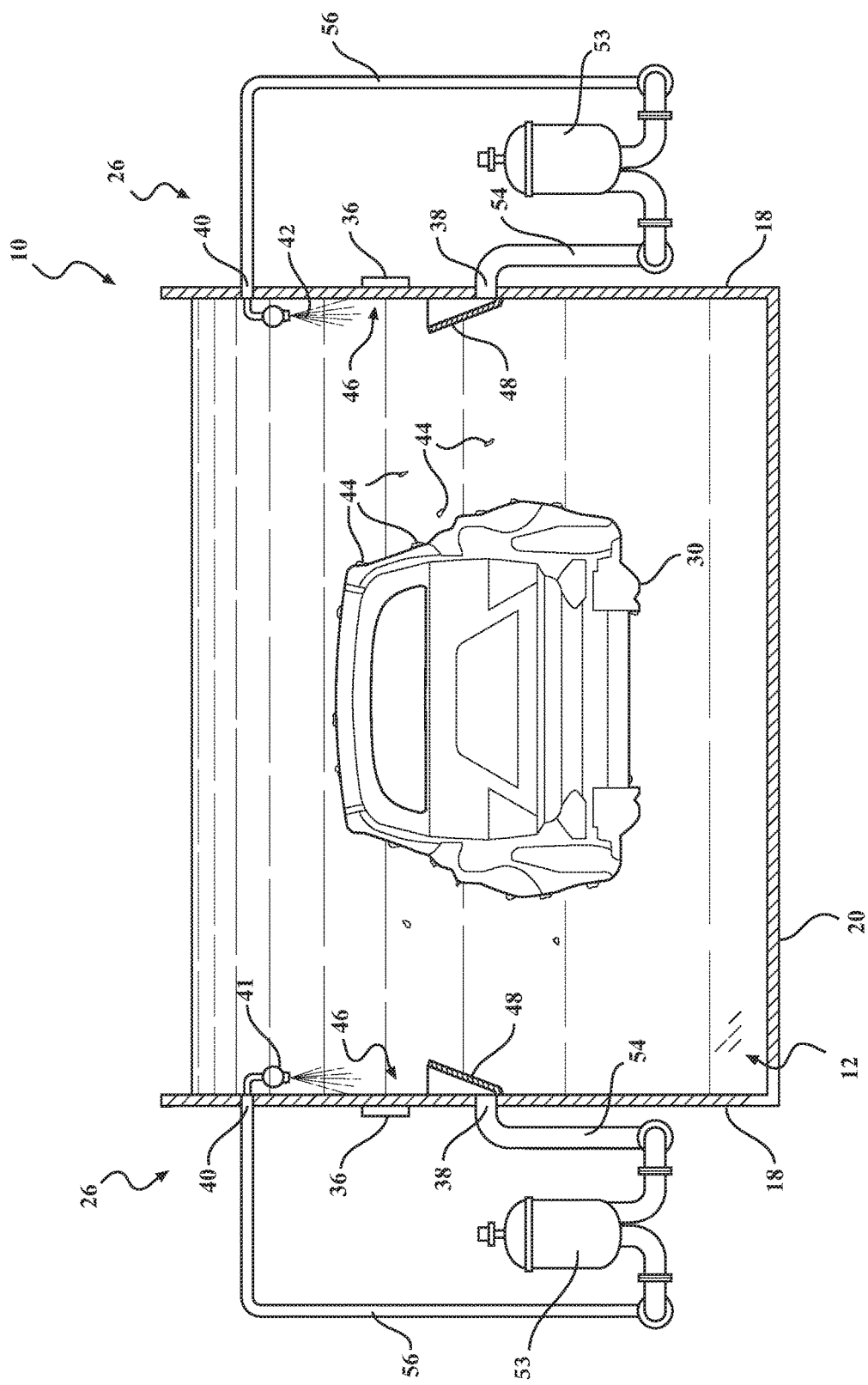
FIG. 4A is a schematic view illustrating an interior of a degreaser tank with a vehicle assembly disposed therein with weldballs adjacent the vehicle assembly.
Figure 4B:
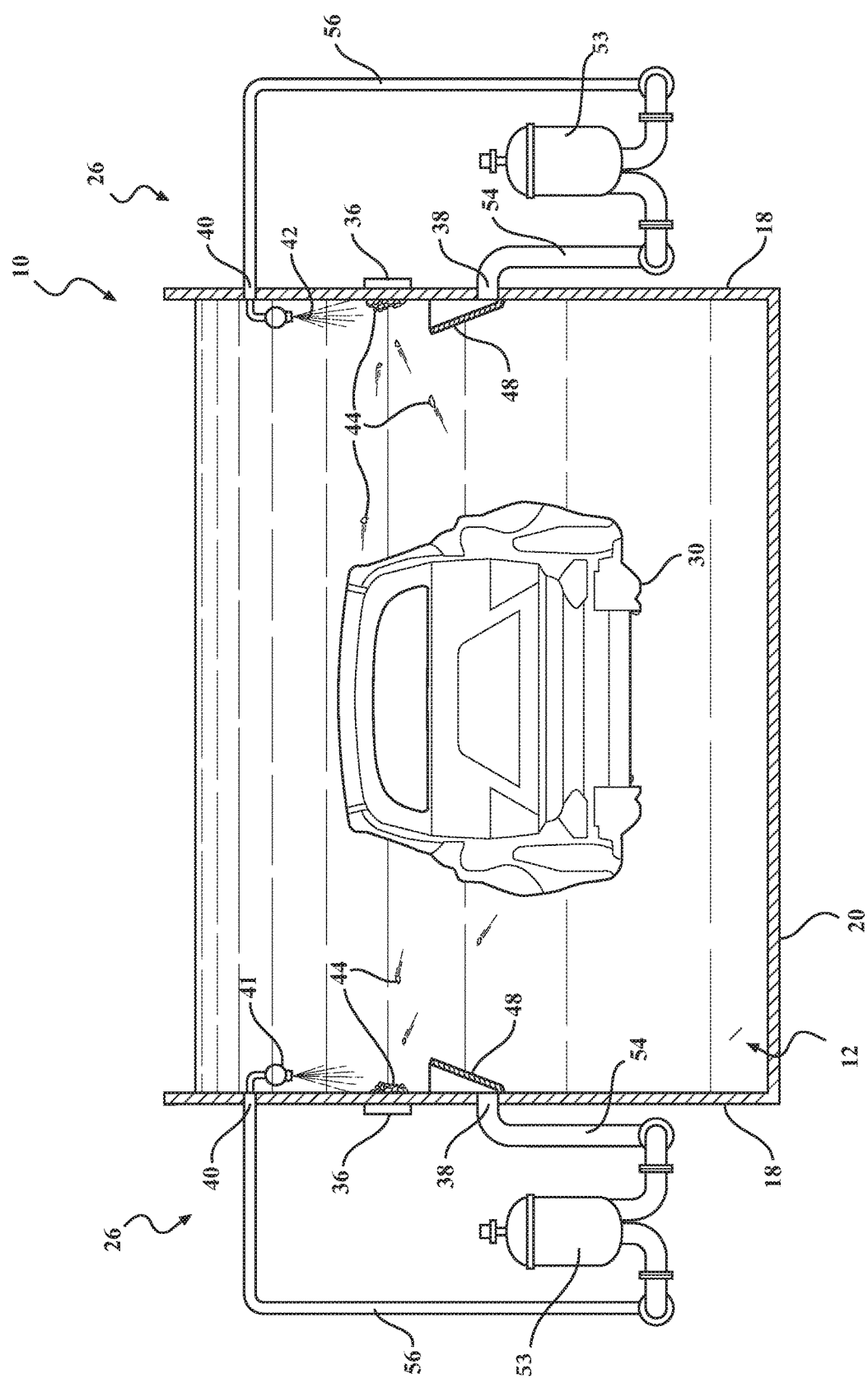
FIG. 4B is a schematic view illustrating an interior of a degreaser tank with a vehicle assembly passing adjacent a pair of debris removal flushing stations.

FIG. 4A is a schematic view illustrating an interior of a degreaser tank 12 with a vehicle assembly 30 disposed therein and, for demonstrative purposes, shown with weldballs 44 substantially adjacent the vehicle assembly 30. This may occur, for example, when the vehicle assembly is first lowered into the degreaser tank 12. FIG. 4B is a schematic view illustrating an interior of a degreaser tank 12 with a vehicle assembly 30 passing adjacent a pair of debris removal flushing stations 26 with the set of electromagnets 36 engaged and generating a magnetic field attracting weldballs 44 and other debris to the respective collection area 46 of each side wall 18. In certain aspects, each filter 53 may include one or more filtering devices, such as a bag filter, that can be removed or replaced for cleaning. For simplicity, FIGS. 4A-4B illustrate the filter 53 by itself. It should be understood that the filter 53 could be combined with a pump 52 as one unit. In other aspects, the filter 53 may be a separate component in fluid communication with the pump 52; preferably the filter 53 is downstream from the pump 52. While FIG. 1 illustrates two pumps 52 and FIGS. 4A-4B illustrate two filters 53, located at various positions, it is also envisioned that the present technology can be used with just one pump 52 and one filter 53, or any other combination thereof.

In various aspects, the system 10 may be provided with one or more drain header pipe 54 in fluid communication with a plurality of drain ports (FIG. 1), and one or more supply header pipe 56 in fluid communication with a plurality of supply lines. In this regard, the drain header pipe 54 and supply header pipe 56 are in direct or indirect communication with the pump 52 and/or filter(s) 53. The drain header pipe 54 and/or the supply header pipe 56 may be coupled with one or more automated valves 58 that may be configured to assist in the engagement or actuation of the flushing stations 26. The automated valves 58 may be located at various strategic locations and be operated using the controller 50 or they may be operated based on actuation of the pumps 52.

The present technology is also direct to various methods for removing debris, in particular a ferrous metal debris, from a vehicle assembly 30 in a degreaser bath. The methods may begin by transferring at least one vehicle assembly 30 through a degreaser tank 12 substantially filled with an alkaline degreaser, or the like, in an effort to remove metal debris 44 from the vehicle assembly 30, while minimizing the opportunity for the debris 44 to reattach to the vehicle assembly 30 while in the degreaser tank 12. It is envisioned that the methods may include one or more vehicle assembly 30 being cleaned at the same time or moving along a conveyor type system. The transfer may be manual, or operated by a controller 50.

In various aspects, a conveyor type system 28 may be used to transfer the vehicle assemblies 30 as shown with renewed reference to FIG. 2. The methods may include engaging a set of electromagnets 36 at one or more debris removal flushing station 26. The set of electromagnets 36 may be coupled to, or otherwise located adjacent to, an exterior 24 of the degreaser tank 12 and are strong enough to be able to attract the metal debris 44 from the vehicle assembly 30 to a collection area 46 located at an interior wall 22 on one of the plurality of side walls 14, 16, 18 of the degreaser tank 12. The collection area 46 may be located generally opposite the set of electromagnets 36. In various aspects, the sides of the vehicle assembly 30 may be between two feet to about five feet away from the flushing station 26 and electromagnets 36.

The methods may include selectively disengaging the set of electromagnets 36 at a first predetermined time, T1. The predetermined time may be monitored by one or more programmed controllers, and modified based on a variety of variables and factors, as discussed above. Once the magnets 36 are disengaged, and with reference to FIG. 3, the methods may continue by opening any optional automated valves 58, and engaging the pump(s) 52 for generating a stream of alkaline degreaser from a supply line 40, optionally using a manifold 41, located a distance above the electromagnets 36. The stream may be generated by one or more pumps 52. By generating a stream of degreaser though one or more spray nozzles of the manifold 41, the method may include directing the aggregated metal debris 44 from the collection area 46 down to a drain port 38, which is ultimately in fluid communication with a pump 52 and a filter for filtering the metal debris from the alkaline degreaser and recirculating a filtered degreaser back to the degreaser tank 12, for example, back through the supply line 40 and manifold.

In various aspects, the methods may include directing the debris 44 from the collection area 46 toward a collection chute 48 shaped and located a distance below the collection area 46. The collection chute may be coupled to an interior of the degreaser tank in fluid communication with an optional drain header pipe and ultimately with the pump 52 and filter(s). After a second predetermined time, T2, the pump may be turned off, and any automated valves may be closed.

The methods may include the continued transfer of the vehicle assembly 30 out of the degreaser tank 12, and then repeat when a new vehicle assembly 30 passes the appropriate stage in the transfer process.

The foregoing description is provided for purposes of illustration and description and is in no way intended to limit the disclosure, its application, or uses. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range, including the endpoints.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "vehicle" should be construed having a broad meaning, and should include all types of vehicles, with non-limiting examples including a passenger car, truck, motorcycle, off-road vehicle, bus, boat, airplane, helicopter, lawn mower, recreational vehicle, amusement park vehicle, farm vehicle, construction vehicle, tram, golf cart, train, or trolley, etc.

For purposes of this disclosure, the term "coupled" (and its variants) generally means the joining of two components directly or indirectly to one another. For example, the joining can be stationary in nature or movable in nature. The joining may be achieved with the two components, and any additional intermediate members or components being integrally formed as a single unitary body with one another or with the two components. Such joining may be permanent in nature or may be movable or releasable in nature, unless otherwise stated.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A degreaser tank for removing debris from vehicle assemblies, the degreaser tank comprising:
   a perimeter having at least one side wall, and a bottom surface cooperating to define a holding tank with an interior configured to store an alkaline degreaser to remove debris from at least one vehicle assembly; and
   a debris removal flushing station located along the at least one side wall, the debris removal flushing station comprising:
   one or more electromagnets adjacent to an exterior of the holding tank and configured to attract metal debris on the at least one side wall;
   a drain port located at the at least one side wall, a distance below the one or more electromagnets; and
   a supply line located a distance above the one or more electromagnets and configured to selectively provide a stream of alkaline degreaser toward debris, and directed to the drain port.

2. The degreaser tank according to claim 1, wherein the perimeter defines a plurality of side walls and the degreaser tank comprises a plurality of spaced-apart debris removal flushing stations at various side wall locations throughout the holding tank.

3. The degreaser tank according to claim 2, further comprising a controller configured to control a frequency of a flushing operation of the debris removal flushing stations.

4. The degreaser tank according to claim 3, wherein the controller is configured to engage the flushing operation of each debris removal flushing station using a predetermined cycle based on at least one of:
   a production volume of vehicle assemblies being cleaned; and
   a type of vehicle assembly being cleaned.

5. The degreaser tank according to claim 4, wherein the flushing operation is engaged for a period of from about 10 to about 20 seconds about four times per hour.

6. The degreaser tank according to claim 2, further comprising a drain header pipe with an automated valve, wherein the drain header pipe is in fluid communication with a plurality of drain ports from the plurality of debris removal flushing stations.

7. The degreaser tank according to claim 6, further comprising a pump and filter in fluid communication with the drain header pipe, the pump and filter configured to filter the debris from the degreaser and return a filtered degreaser to the holding tank via a plurality of supply lines of the plurality of debris removal flushing stations.

8. The degreaser tank according to claim 7, further comprising a supply header pipe providing return fluid communication between the pump and the plurality of supply lines.

9. The degreaser tank according to claim 1, further comprising a collection chute coupled to an interior of the holding tank and configured to collect and direct debris from a collection area adjacent an interior side wall of the holding tank, opposite the one or more electromagnets, to the drain port.

10. The degreaser tank according to claim 9, wherein the supply line comprises a manifold with a plurality of spray nozzles configured to direct degreaser toward the debris from the collection area and down to the collection chute.

11. The degreaser tank according to claim 1, wherein the one or more electromagnets are arranged in a row, coupled to the exterior of the holding tank.

12. A system for removing debris from a vehicle assembly in an alkaline degreaser bath, the system comprising:
   a degreaser tank configured in shape and size to accommodate a degreasing cleaning of vehicle assemblies;
   a conveyor system configured to selectively transfer the vehicle assemblies into and out of the degreaser tank;
   a flushing system including a plurality of debris removal flushing stations located at side walls of the degreaser tank, each debris removal station comprising:
   a set of electromagnets located adjacent to an exterior of the degreaser tank and configured to attract metal debris in the degreaser bath to a collection area at an interior wall, opposite the set of electromagnets;
   a drain port located at a side wall, a distance below the set of electromagnets; and
   a supply line located a distance above the set of electromagnets and configured to selectively provide a stream of alkaline degreaser toward debris, and directed to the drain port; and
   a controller configured to engage each debris removal flushing station based on a predetermined cycle.

13. The system according to claim 12, wherein each debris removal flushing station further comprises a collection chute coupled to an interior of the degreaser tank and configured to collect and direct debris from the collection area to the drain port.

14. The system according to claim 12, wherein the controller is configured to engage a flushing operation of each debris removal flushing station using a predetermined cycle based on at least one of:
   a production volume of vehicle assemblies being cleaned; and
   a type of vehicle assembly being cleaned.

15. The system according to claim 12, further comprising:
   a drain header pipe in fluid communication with a plurality of the drain ports and including an automated drain header valve;
   a supply header pipe in fluid communication with a plurality of supply lines; and
   a pump and filter in fluid communication with the drain header pipe and the supply header pipe.

16. The system according to claim 15, wherein the controller is configured to selectively:
   operate the conveyor system;
   engage and disengage the sets of electromagnets;
   open and close the automated drain header valve; and
   operate the pump to flush debris from the collection area to the drain ports.

* * * * *